United States Patent [19]
Hilterhaus

[11] 4,125,693
[45] Nov. 14, 1978

[54] PROCESS FOR THE PRODUCTION OF POLYURETHANES DISSOLVED IN A SOLVENT AND ALSO THEIR USE FOR THE PRODUCTION OF FABRICATED SHAPES, ESPECIALLY OF MICROPOROUS STRUCTURES

[75] Inventor: Karl-Heinz Hilterhaus, Georgsmarienhutte/Oesede, Germany

[73] Assignees: Chemie-Anlagenbau Bischofsheim GmbH, Osnabruck; Metallgesellschaft AG, Frankfurt am Main, both of Fed. Rep. of Germany

[21] Appl. No.: 775,629

[22] Filed: Feb. 28, 1977

Related U.S. Application Data

[63] Continuation of Ser. No. 518,045, Oct. 25, 1974, abandoned.

[30] Foreign Application Priority Data

Nov. 3, 1973 [DE] Fed. Rep. of Germany ....... 2355073

[51] Int. Cl.$^2$ ..................... C08G 18/10; C08G 18/32; C08G 18/82; C08J 9/28
[52] U.S. Cl. ............................. 521/63; 260/32.6 NR; 521/159; 521/163; 528/61
[58] Field of Search ................... 260/2.5 AY, 2.5 AZ, 260/75 NH, 77.5 CA, 77.5 SP, 77.5 AA, 32.6 NR

[56] References Cited

U.S. PATENT DOCUMENTS

| | | | |
|---|---|---|---|
| 3,577,388 | 5/1971 | Megna | 260/77.5 SP |
| 3,631,138 | 12/1971 | Peters | 260/77.5 SP |
| 3,639,652 | 2/1972 | Mommaerts | 260/32.6 NR |
| 3,640,937 | 2/1972 | Thoma | 260/77.5 SP |
| 3,715,326 | 2/1973 | Traubel | 260/77.5 SP |
| 3,726,836 | 4/1973 | Nakahara | 260/77.5 SP |
| 3,733,310 | 5/1973 | Aitken | 260/77.5 AA |

*Primary Examiner*—C. Warren Ivy
*Attorney, Agent, or Firm*—Stevens, Davis, Miller & Mosher

[57] ABSTRACT

Figure 1:
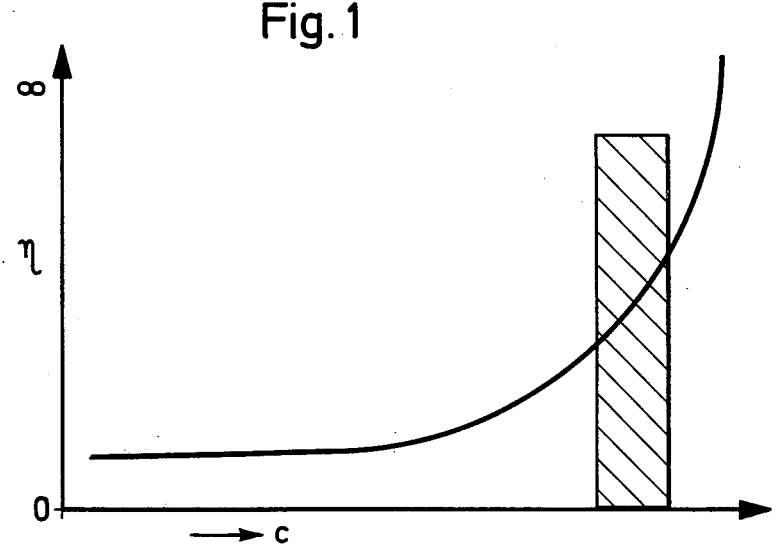

Process for the production of polyurethanes dissolved in a solvent by mixing linear pre-adducts having terminal NCO groups dissolved in solvents with hydrazines and/or dihydrazine compounds and or diamines dissolved in solvents, for the purpose of forming partially cross-linked polyurethanes, whilst continuously measuring the viscosity until the viscosity shows a value which is located in the shaded zone of the section of curves shown in FIG. 1, the addition of the pre-adduct solution being carried out at such a speed that the final solution has solids content of between 25 and 35 per cent by weight, and coagulation of the obtained solution to fabricated shapes, especially to microporous sheet structures.

4 Claims, 2 Drawing Figures

PROCESS FOR THE PRODUCTION OF POLYURETHANES DISSOLVED IN A SOLVENT AND ALSO THEIR USE FOR THE PRODUCTION OF FABRICATED SHAPES, ESPECIALLY OF MICROPOROUS STRUCTURES

This is a continuation of application Ser. No. 518,045 filed Oct. 25, 1974, now abandoned.

The invention relates to a process for the production of polyurethanes dissolved in a solvent and also their use for the production of mouldings, especially of microporous structures, by introducing this highly viscous polyurethane solution after moulding into a coagulation bath.

It is known that polyurethanes can be produced from NCO-pre-adducts by reaction with hydrazines, dihydrazine compounds and/or diamines as chain lengthening agents in highly polar organic solvents, for example dimethyl formamide, when one obtains viscous solutions of mainly linear polyurethane elastomers which can be shaped out of the solution to form elastic threads or foils, for example by the introduction of the moulded products into a coagulation bath. Since in particular the diamines and hydrazines possess a very high reactivity in relation to the NCO-pre-adducts, the addition together of these two reactants in solution in most cases leads to a gelling of the reaction solution, as a result of which any further processing of this solution becomes very difficult or impossible.

It is further known that solutions of polyurethanes in volatile organic highly polar solvents can be mixed with a non-solvent (for polyurethane) which has a higher evaporation index than the solvent, and after the moulding the solvent is mainly evaporated before the non-solvent, when one obtains a microporous surface structure. The disadvantages of such an evaporation process are obvious.

It is therefore the purpose of the invention to make available a process which makes it possible in a reproducible manner to produce partially cross-linked polyurethanes from NCO-pre-adducts dissolved in solvents and hydrazines, dihydrazine compounds and/or diamines dissolved in solvents, these partially cross-linked polyurethanes being still in solution and these solutions showing on the one hand no gelling phenomena of any kind and on the other hand after moulding and introduction into a coagulation bath producing mouldings, especially microporous structures with outstanding properties.

This problem is solved according to the invention in that the NCO-pre-adducts are added at a determined speed to the solutions containing the hydrazines, dihydrazine compounds and/or diamines, the addition of the NCO-pre-adducts being broken off when the reaction solution reaches a given viscosity figure. If the solutions produced in this way are to be used for the production of microporous structures, the hydrazines, dihydrazine compounds and/or amines are added either in a deficient or in an excessive quantity, and in the case of a deficiency additional chain lengthening agents and/or cross-linking agents are used in excess.

The invention therefore relates to a process for the production of polyurethanes dissolved in a solvent by reacting linear pre-adducts possessing terminal NCO groups dissolved in solvents with hydrazines and/or dihydrazine compounds and/or diamines dissolved in solvents, which is characterised by the fact that the NCO-pre-adducts dissolved in a solvent, for the purpose of the formation of partially cross-linked polyurethanes, is continuously mixed in with the hydrazines and/or dihydrazine compounds and/or diamines dissolved in a solvent with a continuous measurement of the viscosity, until the viscosity shows a figure which is located in the shaded zone of the curve section shown in FIG. 1, the addition of the pre-adduct solution being carried out at such a speed that the final solution has a solids content of between 25 and 35 per cent by weight. The invention also relates to the use of the solutions so produced for the production of mouldings, especially for the production of microporous structures.

In the process according to the invention there takes place during the linear polyurethane formation reaction at the same time in part a cross-linking reaction and a certain pre-gelling. The polyurethane formation reaction takes place exothermally and is concluded very rapidly. Both factors bring about the increase in viscosity which can be seen from FIG. 1, according to which the viscosity suddenly increases markedly after an initial slight increase. When carrying out the process according to the invention, therefore, the NCO-pre-adduct solution must be added cautiously to the other components, because after a certain quantity has been added already small quantities of NCO-pre-adduct bring about a marked rise in the viscosity, so that when a given point is reached the reaction solution suddenly gells. It has surprisingly been found according to the invention that outstandingly utilisable polyurethane solutions are obtained if one breaks off the addition of NCO-pre-adduct when the viscosity of the solution has reached such a value on the curve as is located in the marked zone in FIG. 1. In the case of the systems usually employed, this viscosity figure is between 6000 and 10,000 centipoises, that is to say the reaction solution or the final solution has a honey-like consistency.

In the practical execution of the process according to the invention it has also been found that the NCO-pre-adduct solution, which preferably has a solids content of 60 to 80 per cent by weight, especially of 70 per cent by weight, and a content of free isocyanate groups of 1.5 to 5%, is added continuously whilst mixing to the other component solution which contains the hydrazines, dihydrazine compounds and/or diamines in a concentration of 0.02 to 0.05 moles per cent at such a speed that at the moment when the marked increase in viscosity takes place the reaction has a solids content of between 25 and 35 per cent by weight. As the quantity of the NCO-pre-adduct added depends on many factors (temperature, molecular weight of the polyester or polyether used for the production of the pre-adduct, solids content of NCO groups, age of the pre-adduct), it is not possible to calculate this exactly; it is therefore necessary to operate empirically. The safest way is to proceed by determining in a small preliminary test the quantity of pre-adduct approximately required and then in the actual production of the polyurethane end solution to rely upon the increase in viscosity. In order to produce larger quantities of a utilisable end solution or reaction solution it is advisable to use a through-flow gauge which can reproduce the figure found during the preliminary trial. However, according to the invention the fine adjustment is then carried out by means of a built-in viscometer. The simplest apparatus recommended for measuring the viscosity is a falling ball viscometer, because the accuracy is sufficient and the cleaning is easy, although this instrument can only be used in unpigmented systems. If one wishes to stain the product, this must be done after the viscosity has already been adjusted. Another possibility for determining the viscosity is offered by the measurement of the working output of the stirrer motor by a suitable ammeter.

Suitable solvents for the reaction components according to the invention include all solvents in which both the initial components and also the polyurethanes formed are soluble, preferably organic solvents, especially highly polar solvents. Examples of this are aromatic hydrocarbons such as benzene, toluene, xylene, tetraline, decaline, chlorinated hydrocarbons such as methylene chloride, chloroform, trichlorethylene, tetrachlorethane, dichloropropane, chlorobenzene, esters such as ethyl acetate, propyl acetate, butyl acetate, diethyl carbonate, ketones such as acetone, butanone-2, pentanone-2, cyclohexanone, ethers such as furan, tetrahydrofuran, dioxan, anisol, phenetol, dialkoxy-ethanes and ether esters of glycol, acid amides, such as formamide, dimethyl formamide, dimethyl acetamide and sulphoxides such as dimethyl sulphoxide. The solvents which are preferably used include the acid amides, for example formamide, dimethyl formamide and N,N-dimethyl acetamide, sulphoxides, for example dimethyl sulphoxide, dioxan, tetrahydrofuran or mixtures thereof. Although the NCO-pre-adducts can be dissolved in a different solvent from the hydrazines, dihydrazine compounds and/or diamines, in the process according to the invention one preferably uses the same solvent or solvent mixture for both reactants.

The NCO-pre-adducts used according to the invention are higher-molecular compounds with two terminal NCO groups, which preferably possess a molecular weight of 500 to 10,000, especially between 800 and 2,500. Preferably the NCO-pre-adducts have a content of NCO groups of 1.5 to 5%. The production of these NCO-pre-adducts is carried out in a known manner by reacting higher-molecular compounds containing OH groups with an excess of polyisocyanate. The production of such NCO-pre-adducts is described, for example, in Angewandte Chemie 64, 523 to 531 (1952), Kunststoffe 42, 303 to 310 (1952), German Pat. No. 831 772, German Pat. No. 897 014, German Pat. No. 929 507 and U.S. Pat. No. 3,000,757.

One may mention for example as suitable higher-molecular compounds containing OH groups which are suitable for the production of the NCO-pre-adducts: polyesters, polyethers, polyesteramides, polythioethers and polyacetals.

As polyols for the production of the NCO-pre-adducts one may use, for example, linear hydroxylpolyesters which contain terminal hydroxyl groups and which have been obtained either by the polycondensation of ε-caprolactone or 6-hydroxycaproic acid or the copolymerisation of ε-caprolactone with dihydric alcohols or by the polycondensation of dicarboxylic acids with dihydric alcohols.

The hydroxylpolyesters used for the production of the NCO-pre-adducts can also be produced from dicarboxylic acids or mixtures of dicarboxylic acids and dihydric alcohols. Suitable dicarboxylic acids include, for example, adipic acid, succinic acid, suberic acid, sebacic acid, oxalic acid, methyladipic acid, glutaric acid, pimelic acid, azelaic acid, phthalic acid, terephthalic acid, isophthalic acid, maleic acid, fumaric acid, citraconic acid, itaconic acid. Suitable dihydric alcohols or mixtures thereof which are reacted with the dicarboxylic acids or ε-caprolactone to form the desired hydroxypolyesters include, for example, ethylene glycol, propylene glycol, butylene glycols, for example 1,4-butandiol; butendiol, butindiol, bis-(hydroxymethyl-cyclohexane), diethylene glycol, 2,2-dimethylpropylene glycol, 1,3-propylene glycol.

Suitable polyalkylene ethers possessing terminal hydroxyl groups which can be used according to the invention are obtained by reacting an alkylene oxide with a small quantity of a compound containing active hydrogen, such as water, ethylene glycol, propylene glycol, amylene glycol. It is also possible to use alkylene oxide condensates of ethylene oxide, propylene oxide, butylene oxide, amylene oxide, styrene oxide and mixtures thereof. It is also possible to use the polyalkylene ethers which can be produced from tetrahydrofuran.

Every suitable polyester amide can be used according to the invention for the production of the NCO-pre-adducts, for example the reaction product of an amine and/or aminoalcohol with a carboxylic acid. Suitable amines are, for example, ethylenediamine, propylenediamine; suitable amino-alcohols are for example 1-hydroxy-2-amino-ethylene. Any suitable polycarboxylic acid can be used, for example those which have already been mentioned for the production of the hydroxypolyesters. Furthermore it is possible to use a mixture of a glycol and of an amino-alcohol or polyamine. Each of the glycols already mentioned for the production of the hydroxypolyesters can also be used for the production of the hydroxypolyester amides.

According to the invention it is also possible to use for the production of the NCO-pre-adducts those polyols which can be referred to as polyether ester polyols, in which there occur alternating ester bonds and ether bonds. These polyether ester polyols are described in Canadian Pat. No. 783 646.

Polyols preferably used for the production of the NCO-pre-adducts include polyesters on the basis of adipic acid, 1,6-hexandiol and neopentylglycol with an average molecular weight of approximately 2,000 (polyol 2,002, manufacturer: Polyol Chemie of Osnabruck, hydroxyl number 56, acid value 1), polyesters on a polycaprolactone basis with an average molecular weight of 2,000 (Niax polyol D 560, manufacturer: Union Carbide Corporation) and polyethers with the trade name of "Polyol PTMG" of BASF with an average molecular weight of 2,000.

Furthermore, higher-molecular compounds with terminal carboxyl, amino and mercapto groups are also suitable. Polysiloxanes which have groups which are reactive with isocyanates should also be mentioned. Further utilisable compounds are, for example, described in J. H. Saunders, K. C. Frisch "Polyurethanes" Part 1, New York, 1962, pages 33 to 61 and in the Literature cited there.

For the production of the NCO-pre-adducts it is possible to use any suitable organic di-isocyanate, for example aliphatic di-isocyanates, aromatic di-isocyanates, alicyclic di-isocyanates and heterocyclic di-isocyanates, for example ethylene di-isocyanate, propylene di-isocyanate, butylene di-isocyanate, cyclohexylene 1,4-di-isocyanate, cyclohexylene 1,2-di-isocyanate, tetra or hexa methylene di-isocyanate, arylene di-isocyanates or their alkylation products, such as phenylene di-isocyanates, naphthylene di-isocyanates, diphenylmethane di-isocyanates, toluylene di-isocyanates, di or tri-isopropylbenzene di-isocyanates, alalkyldi-isocyanates such as xylylene di-isocyanates, fluoro-substituted isocyanates, ethyleneglycol diphenylether-2,2'-di-isocyanate, naphthalene-1,4-di-isocyanate, naphthalene-1,1'-di-isocyanate, biphenyl-2,4'-di-isocyanate, biphenyl-4,4'-di-isocyanate, benzophenone-3,3'-di-isocyanate, fluorene-2,7-di-isocyanate, anthraquinone-2,6-di-isocyanate, pyrene-3,8-di-isocyanate, chrysene-2,8-di-isocyanate, 3'-methoxyhexane di-isocyanate, octane di-isocyanate, ω,ω'-di-isocyanate-1,4-diethylbenzene, ω,ω'-di-isocyanate-1,4-dimethylnaphthalene, cyclohexane-1,3-di-isocyanate, 1-isopropylbenzene-2,4-di-isocyanate, 1-chlorobenzene-2,4-di-isocyanate, 1-fluorobenzene-2,4-di-isocyanate, 1-nitrobenzene-2,4-di-isocyanate, 1-chloro-4-methoxybenzene-2,5-di-isocyanate, benzene-azonaphthalene-4,4'-di-isocyanate, diphenylether-2,4-di-isocyanate, diphenylether-4,4-di-isocyanate, as well as polyisocyanates containing isocyanurate groups.

Di-isocyanates which are preferably used according to the invention are: 4,4'-diphenylmethane di-isocyanate and/or its 2,4- and/or its 2,2'-isomers, 1,6-hexamethylene di-isocyanate, 2,4-toluylene and/or 2,5-toluylene di-isocyanate and m-xylylene di-isocyanate.

Suitable as hydrazine compounds for the purposes of the invention are particularly hydrazine hydrate, carbohydrazide, carbodihydrazide, semicarbazide, oxalic acid dihydrazide, terephthalic acid dihydrazide and dihydrazides of long-chained dicarboxylic acids and also dihydrazine compounds of the general formula

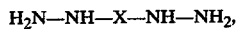

in which X signifies CO, CS, P(O)OR, P(O)NR$_2$, BOR or SiO$_2$, in which R stands for an aliphatic or aromatic radical. Preferably the radicals R represent alkyl or aryl radicals. Obviously in the process according to the invention one can also use the corresponding hydrate forms, which is even preferred in the case of hydrazine.

By the polyaddition of the above-described NCO prepolymers with hydrazine or dihydrazine compounds one obtains, for example, polycarbohydrazides or polycarbodihydrazides or mixtures thereof with recurring units

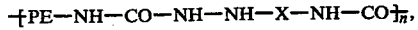

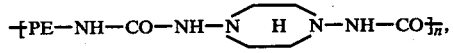

in which the abbreviations PE signifies polyester, polyether, polyamides, polythioether, polyacetals and X signifies a carbonyl, thiocarbonyl-sulpho-SiO$_2$, BOR, P(O)OT or P(O)NH$_2$ group and R stands for an aliphatic or aromatic radical. n signifies that in the finished polyurethane there are contained a large number of the units mentioned before.

Suitable diamines which can be used according to the present invention include, for example, ethylenediamine, propylenediamine, toluylenediamine, xylylenediamine, piperazine or piperazine hexahydrate as well as 1,4-diaminopiperazine.

As already mentioned, according to the invention one uses the hydrazines, dihydrazine compounds and/or diamines preferably either in a deficient quantity or in excess. When one uses a deficient quantity one adds to the prepared component solution further substances which contain at least two groups possessing active hydrogen atoms which react, if desired differently, with isocyanates, and which can act either as chain lengthening agents and/or cross-linking agents, these substances occurring in excess after the stoichiometrical reaction has taken place. These excess quantities then act in a similar manner to an excess of hydrazines, dihydrazine compounds and/or diamines as a pre-gelling agent. In both cases the excess can amount up to 30 %. Suitable compounds of this type include all the other chain lengthening agents or cross-linking agents generally employed in polyurethane chemistry, for example diols, e.g. ethyleneglycol, propyleneglycol, butyleneglycols, 1,4-butandiol, butendiol, butindiol, xylyleneglycols, amyleneglycol, 1,4-phenylene-bis-β-hydroxyethyl ether, 1,3-phenylene-bis-β-hydroxyethyl ether, bis-(hydroxymethyl-cyclohexane), hexandiol, and alkanolamines, for example ethanolamine, aminopropyl alcohol, 2,2-dimethylpropanolamine, 3-aminocyclohexyl alcohol, 3-aminobenzyl alcohol, trimethylolpropane, glycerin or N,N,N',N'-tetracis-(2-hydroxypropyl)ethylenediamine. Of all these substances one preferably uses glycerin. Obviously one can use several chain lengthening agents and/or cross-linking agents at the same time. The presence of water which can also act as a chain lengthening agent and/or cross-linking agent does not upset this process.

If desired it is possible to add in addition to the above-described solution containing hydrazines dihydrazine compounds and/or diamines either besides or instead of the added chain-lengthening and/or cross-linking agents chain cleavage agents as well as possible additional gelling agents. Suitable chain cleavage agents include, for example, monohydric alcohols, for example methyl alcohol, ethyl alcohol, propyl alcohol or butyl alcohol, or substances with an amino group such as ethylamine.

Suitable gelling agents which can be added in addition include, for example, such solvents as are miscible with the solvent or solvent mixture of the finished reaction solution, but which constitute a non-solvent for the partially cross-linked polyurethanes obtained. Such non-solvents include aromatic hydrocarbons such as benzene, toluene, ethylenebenzene, xylene, tetraline, decaline, technical solvent mixtures which contain aromatic hydrocarbons such as Sangajol, aliphatic hydrocarbons such as hexane, heptane, octane, nonane, decane, as well as their stereo-isomers, petroleum fractions such as petrol ether, ligroin, turpentine, white spirit, naphtha, cycloaliphatic hydrocarbons such as methylcyclohexane, turpentine oil, chlorinated hydrocarbons such as chloroform, dichlorethylene, trichlorethylene, hexachlorethane, perchlorethylene, chlorocyclohexane, methylchlorocyclohexane, esters such as methyl acetate, ethyl acetate, propyl acetate, butyl acetate, esters of formic acid, ketones such as acetone, butanone-2, pentanone-2, ethers such as diethyl, dipropyl and dibutyl ether, nitro compounds such as nitromethane, nitrobenzene, alcohols such as tert.-butyl alcohol and nitriles such as acetonitrile.

It goes without saying that according to the systems used the compounds listed here as non-solvents can also act as solvents and the previously listed solvents can also act as non-solvents, so that it is not possible to avoid some overlapping in the list given above.

The solutions containing hydrazines, dihydrazine compounds and/or diamines described above can have added to them prior to their reaction with the NCO-pre-adducts fillers, organic or inorganic pigments, dyestuffs, optical brighteners, ultra violet absorbers, antioxidants and/or additionally cross-linking substances, especially those which only carry out cross-linking after coagulation at elevated temperatures. Sometimes, however, it is more advantageous not to add the abovementioned additives to the solution containing the hydrazines, dihydrazine compounds and/or diamines but to the finished polyurethane solution, possibly just before its use for the production of the desired products.

Advantageously the dyestuffs, which should be soluble in the solvent used, are added shortly prior to coagulation, because a few types of dyestuff can exert a catalytic action on the adduct. A disadvantage of these dyestuffs is that many of them bleach as a result of the action of light.

It is therefore better in certain cases to use the abovementioned pigment colouring materials. It is true that generally speaking these do not give such bright tones as do the soluble dyestuffs, but they are characterised by a good covering power.

It has also been found that contrary to expectations as a result of pigmentation the microporous structure of the surface product is increased still further. This has a favourable effect on the permeability to water vapour.

If the pigments are correctly chosen, the quantity used can be kept small. There is therefore no fear of the elastic properties of the system being adversely affected to any appreciable extent.

In the case of carbon black pigments it is even possible if suitable products are chosen which possess a certain number of OH groups, to incorporate these firmly in the pre-adduct. It should also be pointed out that carbon black pigments are the best stabilisers to hydrolysis of such polyurethane systems.

The floating out of other pigments which has already been mentioned above can be avoided by the addition of so-called anti-floating agents.

Pure fillers are available in a large number. Generally speaking it can be said that all non-reactive powdered or fibrous materials whose individual fibre length is below the thickness of the fibre can be embedded completely. In this way one can ensure that thinner coatings than usual will give more uniform surfaces on a support material.

Of particular interest is the admixture of microporous silicas, with which it is possible to control accurately the microporosity of the foil. Furthermore, these porous earths being the first porous centres in the film while it is still not coagulated are a valuable help in the subsequent non-solvent exchange.

In this case they serve both the function of providing a supporting point for the incoming non-solvent, and they also act as a receiver station for the displaced solvent. In this way one achieves a more rapid coagulation and a more uniform microporosity.

However, it is also possible to operate with reactive additives. If one chooses, for example, a substance containing OH, for example cellulose powder or fibres, it is possible to some extent to incorporate these firmly as fillers. These substances then are particularly suitable for improving the tear resistance. Also, depending upon the length of fibre, it is possible to vary the nature of the surface of the foil.

According to a special form of embodiment according to the invention, one preferably uses as NCO-pre-adduct one which has been obtained by reacting a polyester (produced from adipic acid and hexandiol-1,6) with diphenylmethane di-isocyanate in dimethylformamide. This NCO-pre-adduct solution is added to a solution of a deficient quantity of hydrazinehydrate in dimethylformamide, to which one has added in addition an excess of glycerin. During the addition and the reaction one maintains the reaction temperature between 20° and 40° C, preferably between 25° and 35° C.

Generally one controls the process according to the invention for preparing the polyurethane solutions in such a way that prior to the coagulation all the polyurethanes are dissolved in the reaction solution, but after the coagulation a polymer structure occurs which is no longer soluble to the extent of more than 50% by weight in cold dimethylformamide and is no longer soluble to the extent of more than 60 per cent by weight in boiling dimethylformamide.

The polyurethane solution produced according to the invention is used for the production of polymer structures by introducing the highly viscous solution after shaping into a coagulation bath. As coagulant liquid one can use in principle the abovementioned non-solvents or mixtures of solvents and non-solvents. For economic reasons one uses according to the invention, however, as coagulant liquid preferably water without any additives of any kind. Contrary to the traditional coagulation processes the coagulation takes place more rapidly by the factor 10 in the systems according to the invention.

Obviously one can also treat the objects obtained after coagulation, if there were no suitable additives already present in the polyurethane solution prior to the coagulation, with suitable agents.

The application of the highly viscous reaction solution can be carried out on to porous or non-porous bases. Examples of porous bases are knitted and woven fabrics, fleeces, felts and leather split. Non-porous substrata, such as glass sheets, metal strips, if desired with the negative of a surface embossing or fabric or paper webs coated with perfluoropolyethylene are used if porous flat articles are desired which can be transferred by usual transfer processes, for example adhesion, on to porous bases. Using this method it is possible, for example, to coat timber, foams, leather split, cardboard, paper, woven or unwoven textile articles.

Figure 2:
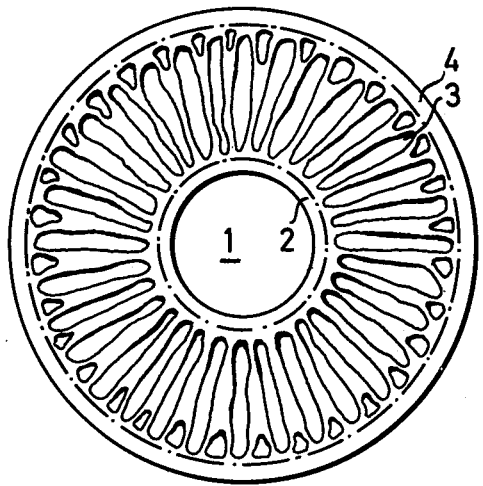

By means of the process according to the invention it is possible to produce microporous flat structures with good mechanical properties, very good flexibility and outstanding resistance to solvent, which display an excellent permeability to water vapour. The microporous flat objects obtained can be finished in the manner which is usual for artificial leather or real leather. They can, for example, be used to advantage in the production of substitutes for leather or as diaphragms. Furthermore by using the process techniques described above it is possible to produce from the polyurethane solutions according to the invention water absorbent threads and microporous hollow fibres. Generally speaking one can produce the microporous structures in any shape, even in such a way that their fine structure consists of two pore-free outer zones adjoining a microporous inner layer which is several times thicker. The polymer structures produced according to the invention can also be used as semi-permeable membranes. The attached FIG. 2 shows a cross-section of an idealised structure of a hollow fibre membrane according to the invention. In FIG. 2 the reference numbers have the following meanings: 1 cavity; 2 semi-permeable inner zone; 3 microporous inner zone; 4 outer semi-permeable outer zone.

To sum up it can be said that the microporous structures according to the invention should preferably be permeable to vapour but only allow liquids to pass under certain conditions and selectively according to the nature of the liquid. Quite generally the microporous surfaces can be used wherever a coating is desired which is permeable to vapour. However, they are specially suitable for the production of artificial leather because they are able to cope with the moisture economy in a shoe in just the same way as real leather. When this is done the foils so produced can be used either as films without a support or else as films coagulated on suitable woven or knitted materials.

If threads or tubes are made by the double nozzle process, one obtains water-absorbent threads and hollow fibres or tubes which as a result of specially controlled coagulation are semi-permeable. For such articles one uses a spin nozzle unit or a system of nozzles inserted one inside the other which ejects coagulation liquid through the inner nozzle and forces the polymer solution out of the outer nozzle.

According to the process of the invention one obtains in this way highly viscous uniformly pre-gelled solution in a single operation which can be stored for days. If one observes the reaction conditions stated (temperature, solids content, time and the correct sequence of the individual stages of the reaction), one obtains in a reproducible manner a "true" solution which is in the boundary area between solution and gel and which leads in a surprising manner to the microporous products mentioned above, the following advantages being obtained in the production of these products: the coagulation time was shortened to one-tenth of the time otherwise usual. The material can be coagulated continuously in pure water. The material can be processed discontinuously on usual commercial application appliances. By choosing suitable raw materials it is possible to control the physical properties for a special purpose. The optical properties can be determined during the production of the polymer structure without any additional subsequent processing. The surface is smooth or contoured according to the way the process is controlled.

The following Examples illustrate the invention, but without restricting it. In the Examples DMF signifies "dimethylformamide".

EXAMPLE 1

Into a dry agitated reactor there are introduced under an atmosphere of nitrogen 2.04 moles of 4,4'-diphenylmethane di-isocyanate with dimethylformamide in a 70% solution at 40° C.

For half an hour at a reaction temperature of 65° ± 2° C 1 mole of a polyester consisting of adipic acid and hexandiol-1,6 with a hydroxyl index of 139.5 and dissolved in 70% DMF solution is added continuously. There is produced a NCO-pre-adduct solution with an NCO content of 2.5 to 3.0% which is stable for weeks.

To 3100 parts by weight of DMF and 50 parts by weight of hydrazine hydrate in a stirrer apparatus equipped with a blade stirrer there is added at 35° C within 5 minutes such a quantity of the abovementioned NCO-pre-adduct solution that the viscosity values measured show a value which is located in the shaded zone of the curve shown in FIG. 1, that is to say a honey-like mass has resulted. The polyurethane solution which is now about 30% is immersed on any substratum in water at 75° C. When this is done a white microporous foil develops in about 3 minutes with a layer thickness of 1 mm.

EXAMPLE 2

An NCO-pre-adduct produced as in Example 1 is stirred into a solution of 3100 parts by weight of DMF, 200 parts by weight of glycerin and 50 parts by weight of hydrazine hydrate until the viscosity values measured show a value which is located in the shaded part of the curves shown in FIG. 1, that is to say a highly viscous honey-like polyurethane solution has resulted. A film 1 mm thick coagulates in a waterbath at 75° C in less than 3 minutes to give a white soft microporous foil.

EXAMPLE 3

In a dry stirrer reactor there are placed under an atmosphere of nitrogen 2.04 moles of 4,4'-diphenylmethane di-isocyanate with dimethylformamide in a 70% solution at 40° C.

For half an hour at a reaction temperature of 65° ± 2° C there is added 1 mole of a polyester in a 70% DMF solution and consisting of adipic acid and equal molar proportions of ethyleneglycol and butandiol-1,4, with a hydroxyl index of 56. The result is an NCO-pre-adduct solution with a residual NCO content of 1.5 to 2.0% which is stable for weeks.

To a solution consisting of 3100 parts by weight of DMF, 90 parts by weight of carbodihydrazide and 100 parts by weight of methanol there is added such a quantity of the prepared NCO-pre-adduct until the measured viscosity values show a value which is located in the shaded zone of the curves shown in FIG. 1, that is to say a highly viscous polyurethane solution has resulted. A wet film 1 mm thick coagulates in a waterbath at 75° C in approximately 3 minutes to form a soft white microporous foil.

EXAMPLE 4

In a dry stirring reactor there are placed under an atmosphere of nitrogen 2.04 moles of 4,4'-diphenylmethane di-isocyanate with dimethylformamide in a 70% solution at 40° C.

For half an hour at a reaction temperature of 65° ± 2° C there is added continuously 1 mole of a polyester in a 70% DMF solution and consisting of adipic acid and hexandiol-1,6 with a hydroxyl index of 139.5. The result is a polyurethane solution with a residual NCO content of 3.2% which is stable for weeks.

To a solution of 300 parts by weight of DMF, 7.68 parts by weight of carbodihydrazide and 10 parts by weight of glycerin there are stirred approximately 165 parts by weight of the above pre-adduct until the measured viscosity values show a value which is located in the shaded zone of the curves seen in FIG. 1, that is to say a honey-like highly viscous polyurethane solution has resulted with a slight evolution of heat and this remains stable for days.

A wet film 1 mm thick coagulates in hot water in less than 3 minutes to form a soft white microporous foil which is flexible when cold and is permeable to water vapour, can be welded and has a smooth surface.

EXAMPLE 5

To a solution of 300 parts by weight of DMF, 2.5 parts by weight of H$_2$O, 0.8 parts by weight of hydrazine hydrate there are added approximately 183 parts by weight of a pre-adduct produced according to Example 4 (NCO: NH$_2$>1) until the measured viscosity values show a figure which is located in the shaded zone of the curves shown in FIG. 1. After coagulation one obtains a soft microporous foil.

EXAMPLE 6

To a solution of 100 parts by weight of DMF, 2.56 parts by weight of carbodihydrazide there are stirred 59.5 parts by weight of the pre-adduct mentioned in Example 4 until the measured viscosity values show a figure which is located in the shaded zone of the curves seen in FIG. 1 (NCO : NH$_2$<1 ). The highly viscous polyurethane solution is coagulated in hot water after being spread on a substratum. The result is a soft microporous foil.

EXAMPLE 7

In a polyurethane solution produced as in Example 1 there is dispersed 10% (reckoned on the solids) of a non-reacting pigment and/or dyestuff with a particle size of up to a maximum of 5μ. A film on a base provided with unevennesses coagulates slowly in a cold waterbath to form a microporous foil with an appearance similar to leather because of the colour change and a good permeability to water vapour.

EXAMPLE 8

An NCO-pre-adduct prepared according to Example 1 or 3 is stirred into a solution of 300 parts by weight of DMF, 11.6 parts by weight of 1,4-diaminopiperazine and 10 parts by weight of glycerin until the measured viscosity values show a figure which is located in the shaded zone of the curves seen in FIG. 1, that is to say a highly viscous polyurethane solution has resulted. A film 1 mm thick coagulates in a waterbath at 75° C in less than 3 minutes to form a soft white microporous foil.

EXAMPLE 9

A polyurethane solution according to Examples 1 to 8 is forced through a nozzle of any shape into a waterbath of 75° C. The result is an elastic microporous fibre.

EXAMPLE 10

A polyurethane solution according to Examples 1 to 8 is forced through the outer ring of a pair of nozzles inserted concentrically one into the other into a waterbath of 75° C, whilst at the same time water flows out of the inner nozzle. There result hollow fibres or tubes (see FIG. 2).

I claim:

1. A process for making partially cross-linked polyurethanes dissolved in an organic highly polar solvent comprising reacting by continuously adding and mixing at a temperature between 20° C. and 40° C.
   (1) a linear pre-adduct having a molecular weight of 5000 to 10,000 and having from 1.5 to 5% by weight free isocyanate groups that has been prepared by reacting an excess of an organic diisocyanate with an organic compound having two reactive hydrogen-containing groups dissolved in an organic highly polar solvent, the solids content of the resulting solution being 60 to 80% by weight pre-adduct, into
   (2) a cross-linking agent selected from the group consisting of hydrazine hydrate and carbodihydrazide in an organic highly polar solvent for the reactants and the resulting partially cross-linked polyurethanes in a concentration of 0.02 to 0.05 mole per cent with continuous measuring of the viscosity of the solution during the addition until the viscosity has reached a range which is indicated by a sudden marked rise in the viscosity to a value from 6,000 to 10,000 cP measured at the reaction conditions and after reaching this range the addition of the linear pre-adduct is terminated, the resulting solids content of the solution of partially cross-linked polyurethanes being between 25 and 35% by weight.

2. The process of claim 1 characterized in that a diamine is added as a chain-lengthening agent.

3. The process of claim 1 characterized in that the solution of cross-linking agent contains hydrazine hydrate and N,N-dimethylformamide.

4. The process of claim 1 characterized in that the viscous solution of partially cross-linked polyurethanes is used to form shaped articles which are then directly coagulated in a waterbath which is free of any additive.

* * * * *